United States Patent [19]

Simmons

[11] Patent Number: 4,739,539
[45] Date of Patent: Apr. 26, 1988

[54] METHOD AND APPARATUS FOR REMOVING FECAL MATTER FROM POULTRY

[76] Inventor: Lacy Simmons, P.O. Box 546, Dallas, Ga. 30132

[21] Appl. No.: 821,910

[22] Filed: Jan. 23, 1986

[51] Int. Cl.⁴ .............................................. A22C 21/06
[52] U.S. Cl. ........................................... 17/51; 17/11
[58] Field of Search .................... 17/11, 58, 43, 51, 45

[56] References Cited

U.S. PATENT DOCUMENTS

| | | | |
|---|---|---|---|
| 1,578,167 | 3/1926 | Nagele et al. | 17/43 |
| 2,322,831 | 6/1943 | Danielsson | 17/58 |
| 3,707,019 | 12/1972 | Wiggins | 17/58 |

*Primary Examiner*—Willie G. Abercrombie
*Attorney, Agent, or Firm*—Eric P. Schellin

[57] ABSTRACT

The disclosure pertains to means and method for effectuating considerable squeezing to a fowl between a back supporting surface and a breast supporting surface whereby the so treated poultry has it feces squeezed out of its anus. The squeezing manipulation occurs most satisfactorily downstream of the scalding step i.e. the feather removing step and prior to an eviscerating step. The bird is carried by a shackle arrangement in a conventional manner, i.e. the bird is carried upside down by a moving endless chain and is either manipulated or worked upon in a conventional and well known manner at various stations. The manipulative station to unload the intestines or feces and the wash away of the excrement is the gist of the present invention.

13 Claims, 5 Drawing Sheets

METHOD AND APPARATUS FOR REMOVING FECAL MATTER FROM POULTRY

BACKGROUND OF THE INVENTION

This invention is in the field of poultry processing apparatus and methods and is more specifically directed to a unique apparatus and method for effecting the removal of ingesta or fecal matter from the intestines of all types of poultry so as to avoid contamination externally of the poultry and, especially of the abdominal cavity.

The U.S. Department of Agriculture has issued regulations for poultry processing plants for the purpose of insuring the public health and welfare with these regulations being enforced by a federal inspection on a continuouses and regular basis. One substantial problem in the processing of poultry arises from the fact that the digestive tract organs are sometimes cut or other wise opened during the eviscerating process so that the ingesta or feces contents are released in the abdominal cavity of the bird to completely contaminate the interior of the cavity. Prior to the present invention there was no satisfactory way for insuring that there would be no contamination in the event an undesirable tearing accident to the intestines resulting in contamination after such an accident. Any contaminated bird or parts thereof are immediately condemned for human consumption and is then normally converted into pet food or the like at substantial loss.

While various devices have been proposed in the past for the purpose of cleaning the abdominal cavity following contamination resultant from rupture of the abdominal organs, none of the prior known devices has proven to be satisfactory and the Department of Argiculture has for the most part properly deferred to approve the usage of such devices on poultry destined for human consumption.

Consequently, the present invention deals not with devices to cleanse an already contaminated abdominal poultry cavity, but rather to manipulate the poultry in a manner by employing unique apparatus whereby contamination is either completely obviated or highly diminished should there be an accident to the intestines.

The nexus of the invention deals with means and method for unloading the intestines through its anus, that is, in a normal way, prior to evisceration. It is understood that some poultry raisers have attempted to permit the live poultry to unload ingesta and feces by terminating feeding for a period of time prior to slaughter. This is unsatisfactory as the poultry may have a lessened acceptable weight.

BRIEF DESCRIPTION OF THE INVENTION

The present invention contemplates the application of considerable squeezing to the fowl between a back supporting surface and a breast supporting surface whereby the so treated poultry has it feces squeezed out of its anus. The squeezing manipulation occurs most satisfactorily downstream of the scalding step i.e. the feather removing step and prior to an eviscerating step. The bird is carried by a shackle arrangement in a conventional manner, i.e. the bird is carried upside down by a moving endless chain and is either manipulated or worked upon in a conventional and well known manner at various stations. The manipulative station to unload the intestines or feces and the wash away of the excrement is the gist of the present invention.

It is disclosed that featherless and headless birds are carried upside down along a conventional conveying system. Each of the birds in turn become positioned in the nip between driven rotating horizontally disposed wheels having located at the periphery of each a plurality of bird accepting vertically disposed arcuate means. The arcuate means on one wheel is adapted and constructed to engage the back portion of a bird while the arcuate means on the other wheel is adapted and constructed to engage the breast portion of the bird. Said engagement takes place as the said arcuate means of one wheel is in confronting relationship with the arcuate means of the other wheel. It is desirable that the bird is positioned therebetween for a momentary but uninterrupted dwell time.

During the said dwell time of the wheel carrying the breast accepting arcuate means, the birds' external abdominal area is given a vigorous squeeze by cam operated two descending pins. During the said squeezing step the anus of the bird, which extends upwardly, is forced open by the contents of the intestine and is discharged therethrough and results in spillage over the external surface of the bird.

The bird continues its mode of travel, not having stopped at all during the squeezing manipulating step, along a horizontal plane. As it progresses beyond the said manipulative step the bird is subjected to strong washing action by appropriately positioned high pressure nozzles for streams of water whereby the feces on the surface of the bird is entirely removed.

It is pointed out that the ingenious squeezing method and apparatus does not injure the bird and the resultant bird in commercially acceptable.

It is contemplated that the bird then goes the usual conventional additional steps including for example evisceration, cleansing, inspections etc.

Figure 1:
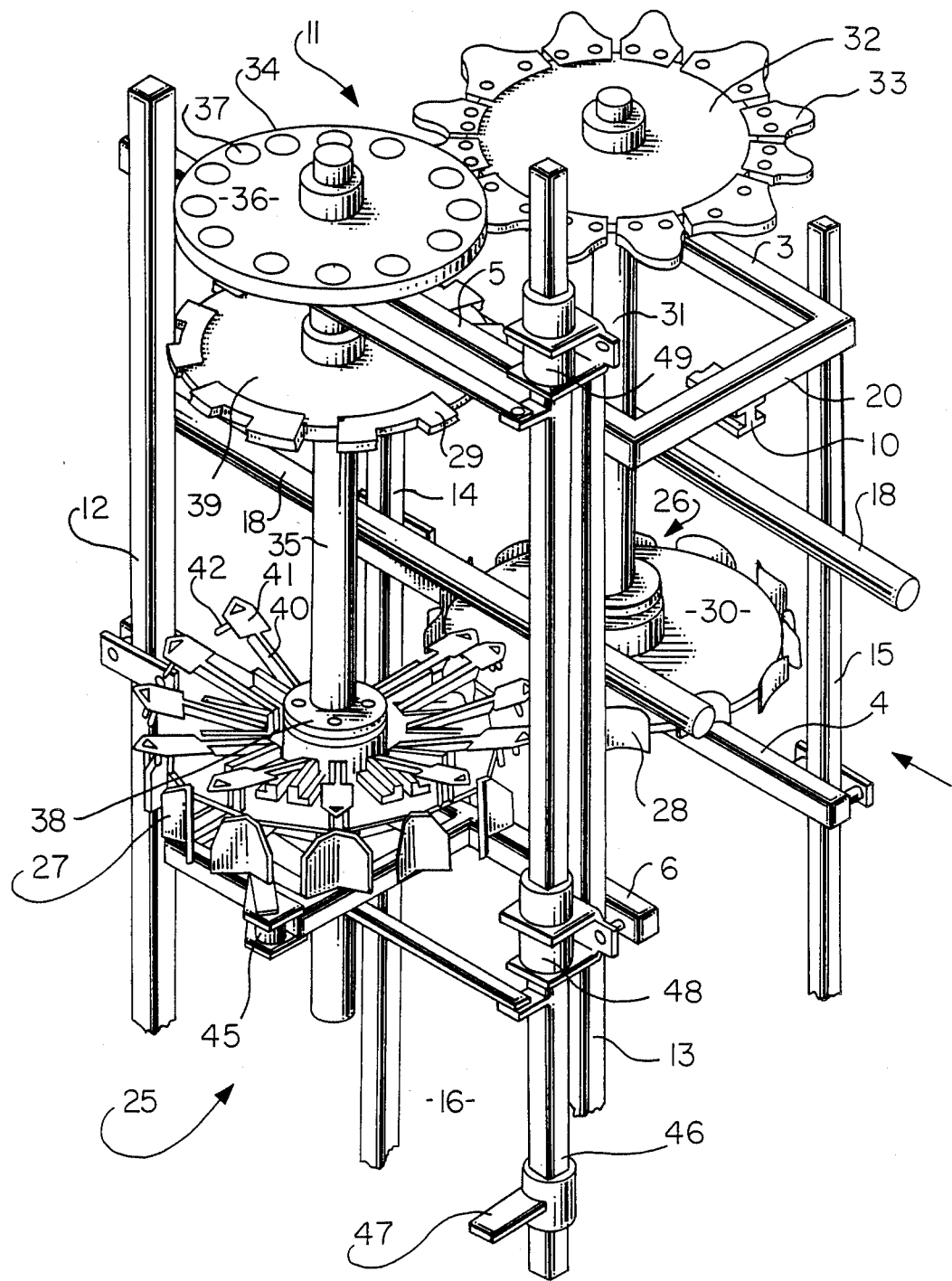
FIG. 1 is a perspective view of the device of the present invention.
Figure 3:
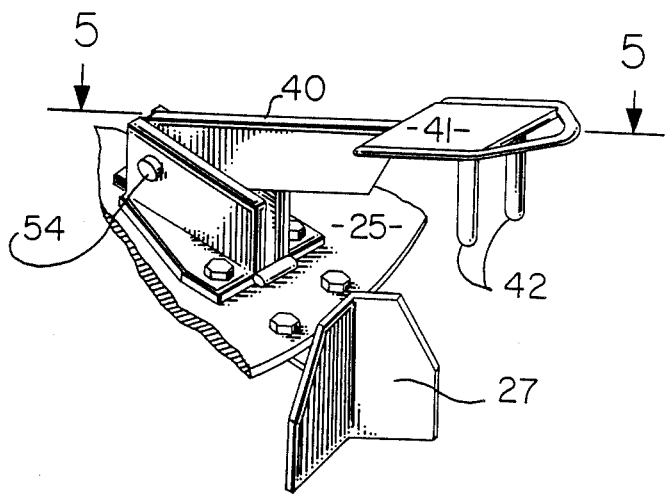
FIG. 3 is a view of the pressure application means in a retracted position.

Now, turning to the drawings with particular emphasis on FIG. 1, it will be seen that the device, shown in general, by reference number 11 is detailed to straddle a portion of a conventional I-beam 10. The I-beam supports on the horizontal portion on each side of the lower web portion of the I-beam a double roller element 9 to which a shackle 8 is secured in a conventional manner to an endless cable 7 at equidistant positions thereon. The shackle is adapted and constructed to carry a de-feathered killed fowl in the manner shown in the FIG. 2, i.e. in an upside down fashion.

For purposes of illustration, the positioning in FIG. 1 is shown whereby the direction of travel is in denoted by the arrow and front and rear of the apparatus is defined. It is pointed out however that the apparatus of the present invention may be operated in the opposite manner, if desired.

Figure 2:
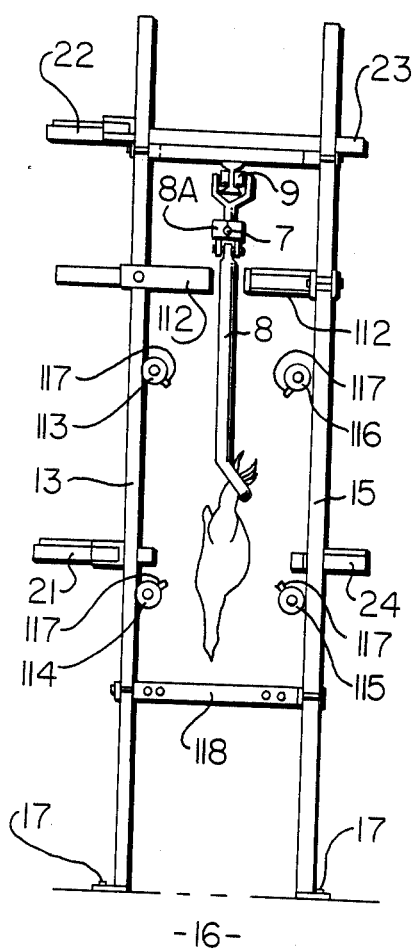
FIG. 2 is an end view of the support frame for the operational means of the present invention in a direction downstream.
Figure 4:
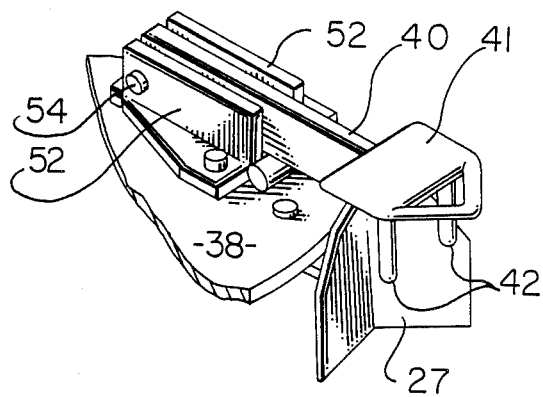
FIG. 4 is a similar view of the pressure application means when in a pressure application position.

Bearing this in mind, it will be seen that the manipulative portions of the apparatus are mounted on a frame consisting of rigid vertical uprights 12 and 13 at the front side and rigid vertical uprights 14 and 15 at the rear side. FIG. 2 is of interest in showing the ingress view of the frame, especially the vertical uprights. The uprights are secured to the floor 16 as by bolts 17. The uprights cross piece 18, being tubular, functions as a manifold for water distribution for the jets appropriately located for jet action water washing of the bird, as explained more fully hereinafter. A cross piece 20 is also located considerably above cross piece 18. The aforementioned I-beam 10 is secured to the cross piece 20 to present an over all rigid construction. Suitable horizontal cross pieces 3 and 4 connecting uprights 14 and 15 are provided as well as cross pieces 5 and 6 for connecting vertical uprights 12 and 13.

Cross pieces 5 and 6 have secured thereto outwardly perpendicularly vertically displaced frame supports 21 and 22 of approximately similar size. At the same time in essentially the same planes cross pieces 3 and 4 have outwardly perpendicularly vertically displaced frame support 23 and 24 also of a similar size but somewhat smaller than supports 21 and 22.

Supports 21 and 22 are designed to carry the front manipulative portion 25 of the apparatus while supports 23 and 24 are designed to carry the rear manipulative portion 26 of the apparatus. In other terms the front manipulative portion has, essentially, V-shaped elements 27 designed to engage the breast portion of the fowl while the rear manipulative portion has, essentially, U-shaped elements 28 designed to engage the back portion of the fowl.

It will be noted that the U-shaped element 28 is vertically secured to the circumference of a horizontally disposed wheel 30 in carousel fashion. The carousel-wheel 30 is appropriately splined to the lower end portion of vertical shaft 31. The upper end portion of the vertical shaft 31 has splined thereto a horizontally disposed petal gear 32, consisting of a disc portion and extending therefrom large petals 33 which act as teeth for operative engagement with horizontally disposed gear 34 splined to the uppermost portion of shaft 35. The gear 34 consists of a disc portion 36 having descending therefrom at the underside thereof a plurality of equidistantly spaced pegs 37. The spaces between the pegs 37 are adapted and constructed to mesh with the petals 33 of petal gear 32 when said rear and front portions 25 and 26 are in operative relationship.

Displaced vertically below peg gear 34 and suitably splined to the shaft 35 is another wheel gear 39 having radially outwardly extending teeth 29 adapted and constructed to sequentially mesh with the cable 7 between the spaced roller elements 9. When said wheel gear 39 is in operative engagement with the cable 7 and the cable is driven horizontally and linearly in a known manner the wheel gear 39 is rotatably driven as a power take-off mechanism. Displaced vertically below the wheel gear 39 is another carousel 38 appropriately splined to the shaft 35. The carousel 38 on its circumference has mounted a plurality of V-shaped elements 27 designed to engage the breast of the fowl. The number of V-shaped element 27 are the same as the U-shaped elements 28. The diameters of the carousel 30 and the diameter of carousel 38 are dimensioned whereby when the respective carousels are rotated the breast receiving element 27 is always opposite the back receiving element 28 at the nip between the two carousels.

It can be seen from the FIG. 1, that above each V-shaped element 27 is a pivotally mounted lever 40 carrying at its distal end portions 41 two depending rods 42. The distal end portion 41 extends radially outwardly for a distance beyond radially of the V-shaped elements 27. Cam operating mechanism is provided which maintains the lever as indicated for almost all of the rotation journey described by the carousel 38 as more fully explained hereinafter. However, suitable mechanism is provided underneath the carousel 38 which drives the lever 40 downwardly whereby the said distal end portion 41 carrying the pins 42 project vigorously against the breast portion of the bird when a bird is in the nip portion between the two carousels 30 and 38. At such juncture the contents of fecal matter is squeezed out of the anus of the bird in the manner heretofore described. A further rotation of the carousels 30 and 38 produced by the linear cable movement free the bird and the lever 40 carrying the pins 42 is raised into a non-operative position. More details with regard to said cam action for said level 40 will entertained below.

Figure 10:
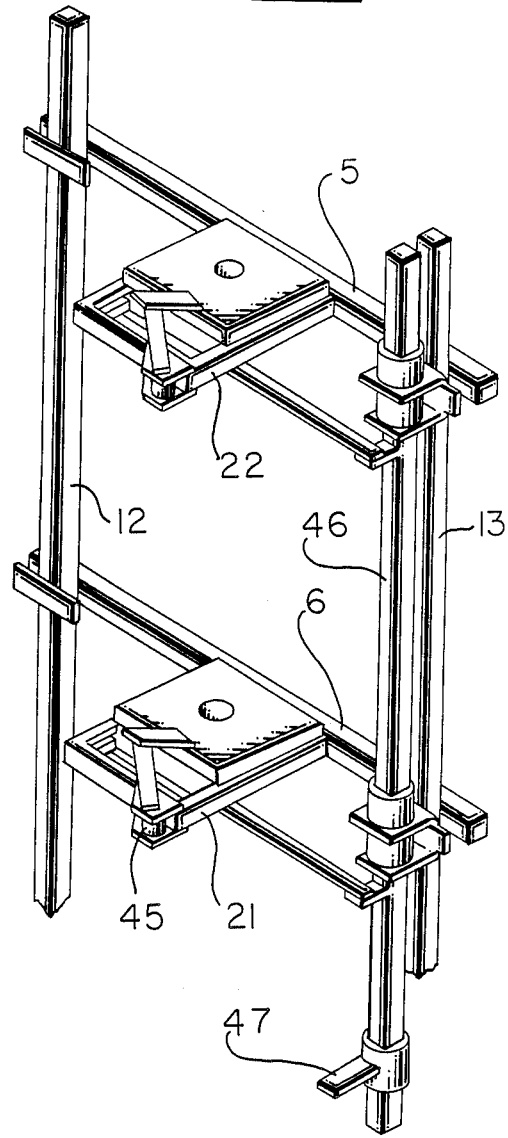
FIG. 10 is the engaging and disengaging means for the above mechanism.

The front apparatus 25 is mounted on a slide arrangement on each of support 21 and 22 as seen from FIG. 10 whereby the front apparatus 25 may be moved for a relatively short distance perpendicularly with respect to said cable thereby the wheel gear 39 may be placed into engagement with the cable 7 or conversely into disengagement as desired. When wheel gear 39 is in disengagement rotation of both front and rear manipulative portions cease operating, that is, do not rotate but also the slide of the front manipulative mechanism carries carousel 38 sufficiently distant at the nip with carousel 30 whereby birds may be conveyed therebetween without hinderance and without manipulation.

The mechanism for engaging and disengagement, that is, for moving the slide in the supports 21 and 22 are of a conventional nature where suitable bell crank mechanism 45 is provided for retraction and projection. A bell crank 45 is provided at each support 21 and 22 and each is operated simultaneously through rotatable vertically disposed shaft 46 journalled at 48 and 49, for instance, to upright 13. The shaft is manually operated by lever 47, as desired.

Attention is now directed to FIGS. 3–6 for a better understanding of the pressure application mechanism mounted on the front carousel 38. Note that lever 40 has an L-shaped configuration, the short portion thereof extends through a rectangular opening 50 on carousel 38. It is pivotally secured, thereto by means of spaced angle plates 52 which are to the suitably bolted to the supper surface of the carousel 38. A pivot hole 53 of the L-shaped lever 40 is mounted to rotate on a short axle 54 which passes through pivot hole 53 and suitably disposed holes 55 on the upstanding portions of angle plates 52.

The short portion of the leg is pivotable, secured to the yoke 56 of reciprocatable horizontally disposed plate 57 the underside of which has a depending stub shaft 59 to which idle roller 58 is rotatably affixed. The plate 57 is mounted to the underside of the carousel 38 between plate 60, and radially channeled block 61. The said plate 60 and block 61 are sandwiched between a horizontally disposed plate 69 to which is suitably secured the V-shaped element 27, aforementioned.

Figure 5:
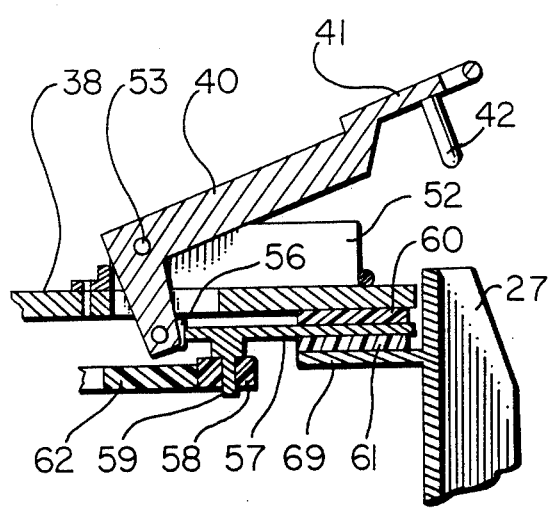
FIG. 5 is a cross-sectional view taken along lines 5—5 of FIG. 3.
Figure 6:
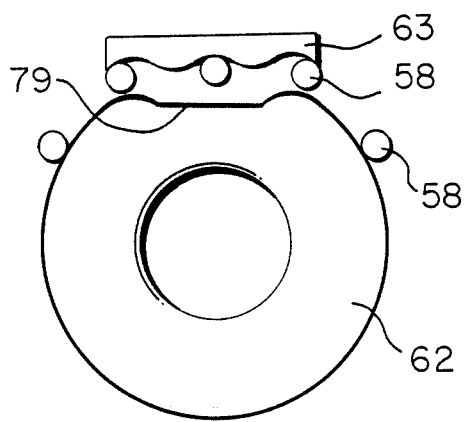
FIG. 6 is on exploded view of the pressure application means.

It will be noted that from FIG. 5 idle roller 58 is in rotatable abutment with large generally annular cam 62 and, as shown, lever 40 is in an upward extending mode.

Figure 7:
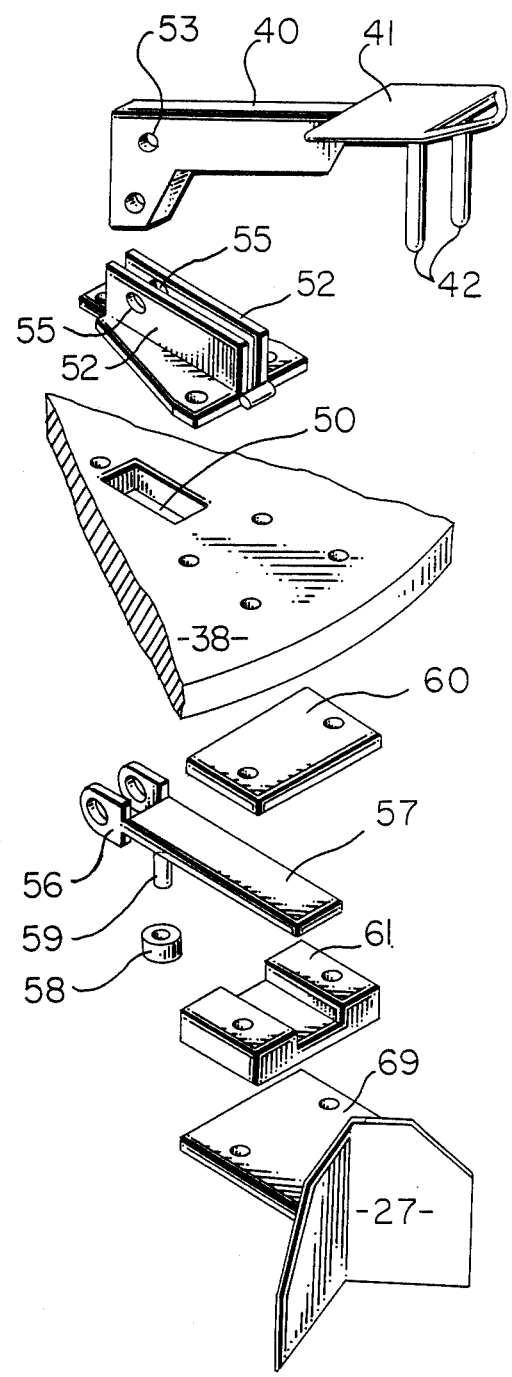
FIG. 7 is a top plane view of the large cam and a small cam.

Turning now to FIG. 7 for an understanding of the manner in which the plate 57 is disposed to reciprocate the cam 62 has an inwardly radially depression 79 which surface must be followed as a result of the spaced cam 63 against which the idle roller 58 comes into abutment when each breast V-shaped element 27 comes into the grasping position. The cam 63 is mounted to be adjustable thereby its impingement on the idle roller 58 is controllable whereby the linear amount of reciprocation on plate 57 is limited. The feature involving an adjustment has been found salutary to accommodate different sizes of birds. FIG. 7, then, is demonstrative of the stated cam action.

Figure 8:
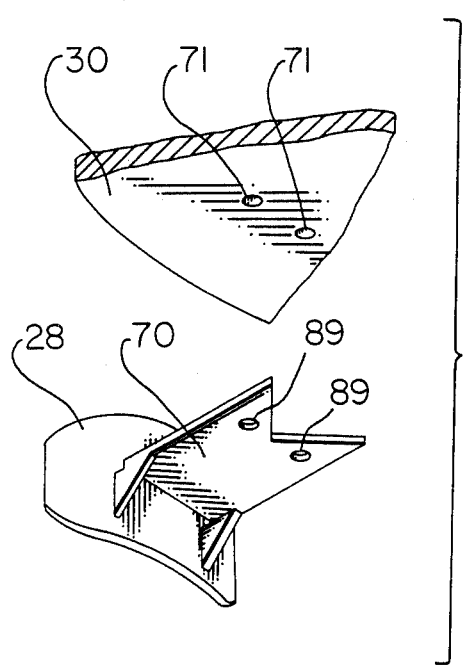
FIG. 8 is an exploded view of a portion of the carousel showing the means for attaching the back engaging means.

FIG. 8 depicts an exploded view of a pie shaped portion of the carousel 30 to which, as has been stated, is attached the back engaging element 28. The rear portion thereof has a flange 70 attached thereto having suitable openings 89 for bolting the said element 28 to the underside of the carousel 30 through corresponding holes 71.

Figure 9:
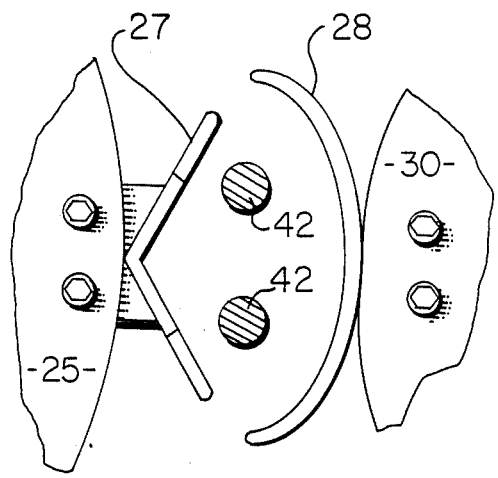
FIG. 9 is a dimensionally accurate view of the breast engaging means and back engaging means when opposite each other with the pins in cross section.

FIG. 9 is designed to show the juxtaposition of the elements 27 and 28 with the pins in cross-section when the said elements are in a confrontation relationship, that is, applying squeezing action to a bird (not shown).

Figure 11:
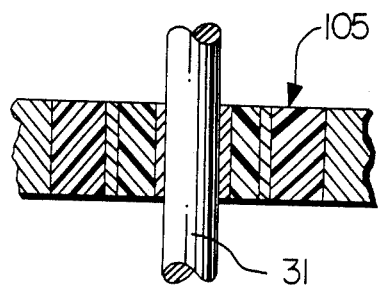
FIG. 11A and FIG. 11B is to the adjustment means for the rear back engaging means.
Figure 11:
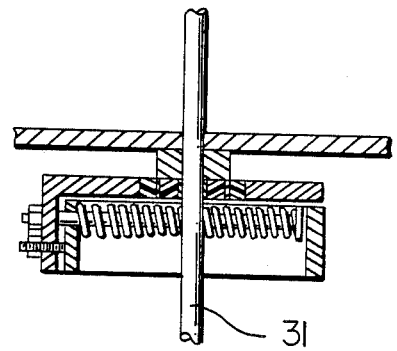

In the foregoing, commentary has been provided with respect to the disengaging and engaging means to effectuate rotation of the front portion of the apparatus (see FIG. 10 for particulars). The rear back engaging means is also possessed of an adjustment means to accommodate various girth of birds, attention with respect thereto is to FIG. 11A and 11B which shows an elastic journally 105 at the upper portion of the shaft 31 proximate the said petal wheel 32. The journalling at the lower end of the shaft is below the carousel 30 and consists in a more liberal movement and a spring loaded abutment which is adjustable as can be seen.

Figure 12:
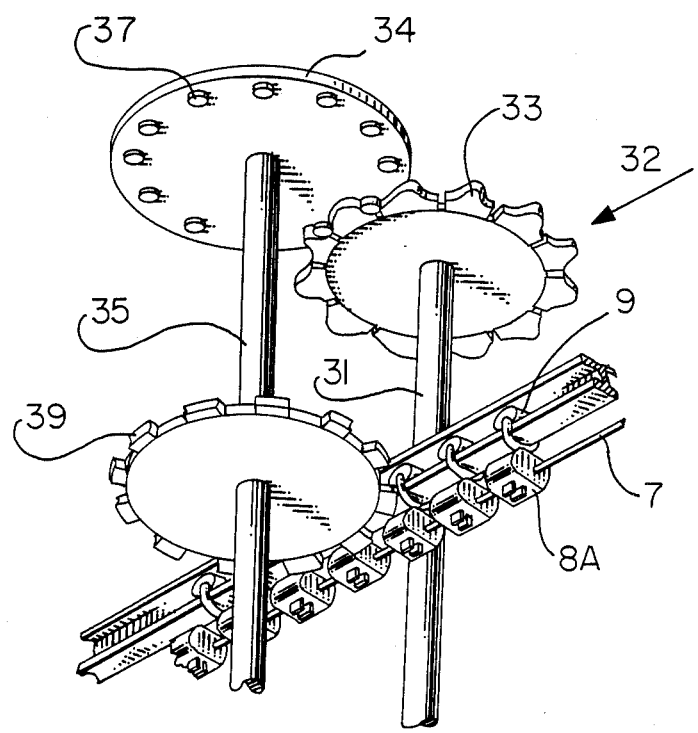
FIG. 12 is a view from below of the petal gear, driven gear and peg wheel.

To view with greater illumination, FIG. 12 is a perspective view from below to show the interaction of petal gear 32 with peg gear 34 and twin driven chain engaging gear 39. It is pointed out that all parts that are metal are constructed of stainless steel.

FIG. 2 is useful in depicting the path transcribed by the bird carrying shackle 8 which is attached to clamp 8A which in turn is secured to the cable 7 as herein before discussed. The sideways motion of the shackle is diminished by providing horizontal guide bars 112 to define a circumscribed pathway therebetween. The guide bars are secured to the aforementioned uprights. The said uprights also have mounted horizontally thereon elongated water carrying pipes 113, 114, 115, 116, each being apertured with jet nozzles 117. The water is supplied to the said pipes from the manifold cross-piece 118 which has suitable flexible conduits in fluid connection with the said pipes 113, 114, 115 and 116. In operation any expressed fecal matter is marked off the bird by the water emanating from the nozzles.

What is claimed is:

1. A method for manipulatively removing the fecal matter from poultry comprising:
    (a) passing the poultry between the nip of two rotating means, one rotating means carrying a back engaging means and the second rotating means carrying a breast engaging means,
    (b) rotating said two rotating means whereby said back engaging means and said breast engaging means are in confronting relationship and a single poultry is positioned between said back engaging means and said breast engaging means,
    (c) applying pressure against the wall of the poultry's abdominal cavity sufficient to effectively discharge feces from the poultry through its anus.

2. The method of claim 1 wherein the pressure is applied to the poultry during the time it is present in the nip of the said two rotating means.

3. The method of claim 2 wherein the preassure is applied along two elongated portions of the poultry external of the abdominal wall.

4. The method of claim 2 wherein the poultry is washed free of any fecal matter.

5. The method of claim 3 wherein the poultry is washed free of any fecal matter.

6. The method of claim 5 wherein the poultry is manipulated in an upside down position.

7. An apparatus for squeezing killed fowl while hanging upside down from a shackle comprising a first rotatable carousel having mounted around the circumference thereof a plurality of vertically positioned U-shaped elements adapted and constructed to engage the back of the fowl, a second rotatable crousel having mounted around the circumference thereof a plurality of vertically positioned V-shaped elements adapted and constructed to engage the breast of the fowl, drive means adapted and constructed to rotate said first and second crousel along the same horizontal plane, said first rotatble carousel and said second rotatable carousel being positioned with respect to one another whereby a nip is defined therebetween whereby when the said carousels are rotated a fowl when placed in the nip is grasped at its back by a U-shaped element and at its front by a V-shaped element, means positioned on said second rotatable carousel adapted and constructed to project against the breast of the fowl when positioned in the nip defined by the two crousels whereby any fecal matter is squeezed out of the anus of the fowl should fecal matter be present in the intestines of the fowl.

8. The apparatus of claim 7 wherein the means to project against the breast side of the fowl includes two vertically disposed pins, the pins being mounted at the distal end portion of a lever, said lever being pivotably mounted on the carousel, means adapted and constructed to normally retain said lever in a position whereby the pins are not in a pressure projecting position, and means adapted and constructed to drive said lever into a position whereby said pins are in a pressure projection position whenever the corresponding V-shaped breast of the fowl engaging means of the second carousel is in position opposite to the U-shaped back of the fowl engaging means of the second carousel.

9. The apparatus of claim 8 wherein the lever carrying the said pins is mounted at the top side of the carousel, the lever has an arm projecting through an aperture of said carousel, means acting on said arm to selectively actuate said lever and said pins.

10. The apparatus of claim 9 wherein the means acting on said arm is a horizontally positioned plate means having a depending horizontal cam follower on a vertical axis, an annular cam, said cam follower positioned to ride on the outer circumference of said annular cam, said annular cam having an area of small diameter opposite to the area where the said carousels are closest to each other, a second cam horizontally associated with said cam follower and also at the same area where the carousels are closest for driving the means acting on said arm inwardly radially whereby to act on said lever and upwardly extending angular position to a general horizontal position.

11. The apparatus of claim 10 wherein means is provided for rotating said first and second crousels from a single drive source.

12. The apparatus of claim 11 wherein means is provided for engaging and disengaging said drive means.

13. The apparatus of claim 12 wherein washing means is provided for washing expressed fecal matter of the surface of the fowl.

* * * * *